INVENTOR
MANFORD S. DeLAY
BY
ATTORNEY

Oct. 6, 1970  M. S. DE LAY  3,531,923
COMBINATION MOWER AND MULCHER
Filed July 19, 1968  2 Sheets-Sheet 2

INVENTOR
MANFORD S. DeLAY
BY John D. Pope
ATTORNEY

United States Patent Office 3,531,923
Patented Oct. 6, 1970

3,531,923
COMBINATION MOWER AND MULCHER
Manford S. De Lay, 414 N. Pine, Republic, Mo. 65738
Filed July 19, 1968, Ser. No. 746,027
Int. Cl. A01d *35/26*
U.S. Cl. 56—25.4     6 Claims

ABSTRACT OF THE DISCLOSURE

A combination mower and mulcher is provided having attachments so it can be utilized either as a standard mowing machine or as a combination mower and mulcher. Alternatively, other attachments can be added to convert it to a leaf mulcher. The unit includes a rotating cutter, a plate over the cutter, a skirt attached to the plate and extending down and substantially around the cutter to shield the cutter, and means mounted on the plate for rotating the cutter. A plurality of comparatively large openings are located in the skirt for discharging mulched vegetation. A shield is attachable to the skirt for covering these large openings and an additional cutting blade and band with smaller openings can be attached for mulching leaves. An overskirt can be attached to obviate danger from hard objects discharged by the unit.

---

The present invention relates to a combination mower and mulcher and, more particularly, to a convertible unit which can be used as a combination mower and mulcher, a conventional mower, or as a leaf mulcher.

Among the objects of the present invention are the provision of a rotary mower which can simultaneously mow and mulch vegetation; the provision of a mower of the type indicated which can be readily altered to mow vegetation without mulching it; and the provision of a mower of the type indicated which can be readily converted to an effective leaf mulcher. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a perspective view of the combination mower and mulcher of the present invention;

Corresponding reference characters indicate corresponding parts throughout the several views of the drawings.

Figure 1:
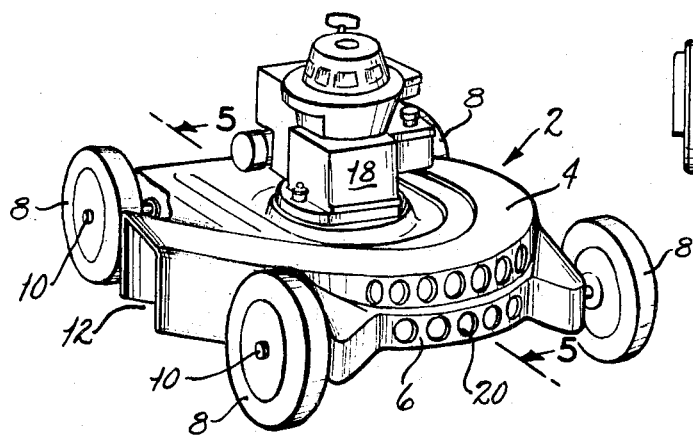
Figure 2:
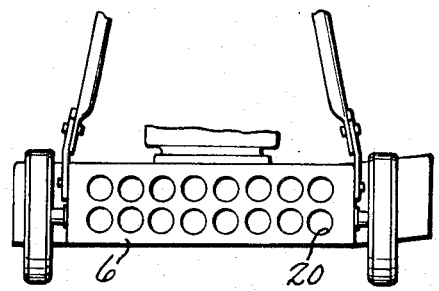
FIG. 2 is a rear elevation of the FIG. 1 mower.
Figures 3, 5:
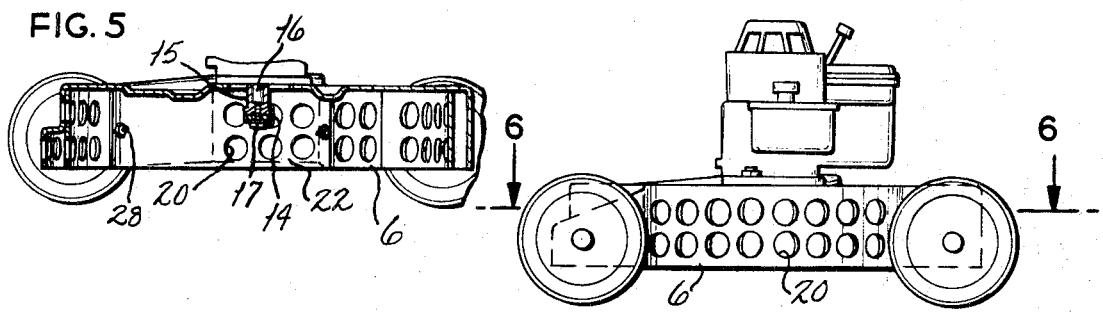
FIG. 3 is an elevation of one side of the FIG. 1 mower.
FIG. 5 is a section taken along line 5—5 of FIG. 1.
Figure 6:
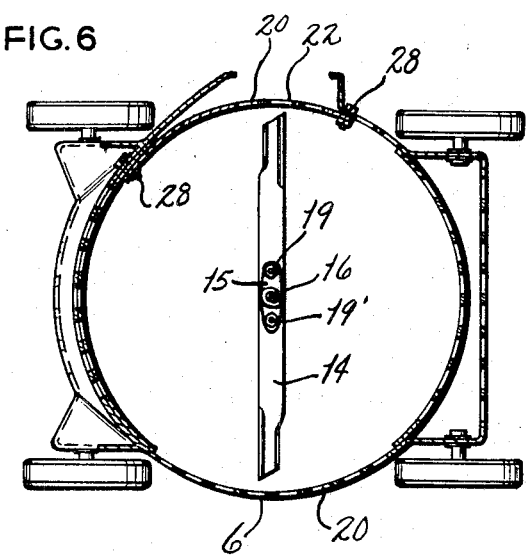
FIG. 6 is a bottom plan looking upward of the FIG. 1 mower.
Figure 4:
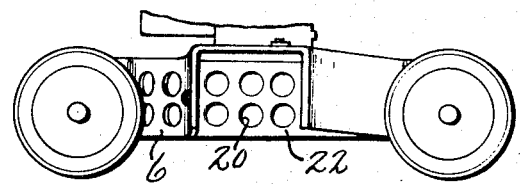
FIG. 4 is an elevation of the other side of the FIG. 1 mower.

Referring now to the drawings, a combination mower and mulcher 2 includes a plate 4, skirt 6, and wheels 8. Wheels 8 support the entire assembly through axles 10. Skirt 6 has an escape gate 12 for discharging cut vegetation when the unit is not arranged for combination mowing and mulching. For combination mowing and mulching a plate 22 is held across escape gate 12 by bolts 28.

The cutting blade 14 is of the usual type for rotary mowers. It is operated through a shaft 16 by a motor 18 to cut and discharge vegetation in the usual manner. Blade 14 is held on shaft 16 by a plate 15 and a bolt 17. Plate 15 is held to blade 14 at 10 and 19'.

A plurality of comparatively large openings 20 are drilled in skirt 6. A plate 22 attached by bolts 28 across escape gate 12 also includes a group of openings 20. Openings 20 are sized to prevent the escape of cut vegetation until it has been mulched by rotating knife blade 14. It has been found that openings approximately 1¼ inches in diameter satisfactorily accomplish this result. When the unit is operated as a combination mower and mulcher, vegetation is cut by blade 14 in the usual manner but the cut portions are rebounded by skirt 6 and plate 22 back into the path of knife blade 14 until they have been mulched sufficiently to escape through openings 20. In this way vegetation can be cut and mulched in the same operation while simultaneously distributing it in the cut area.

Figure 8:
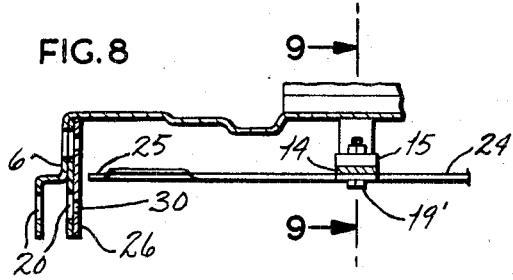
FIG. 8 is a section taken along line 8—8 of FIG. 7.
Figure 7:
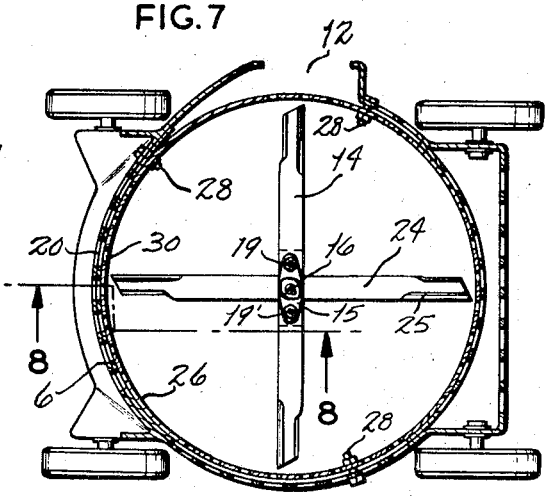
FIG. 7 is a bottom plan of the mower looking upward with added components for leaf mulching.
Figure 9:
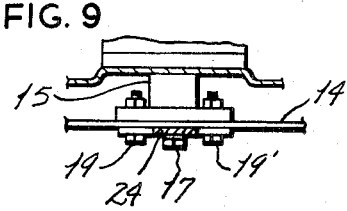
FIG. 9 is a section taken along line 9—9 of FIG. 8.
Figure 11:
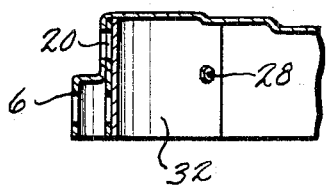
FIG. 11 is a section taken along line 11—11 of FIG. 10.
Figure 10:
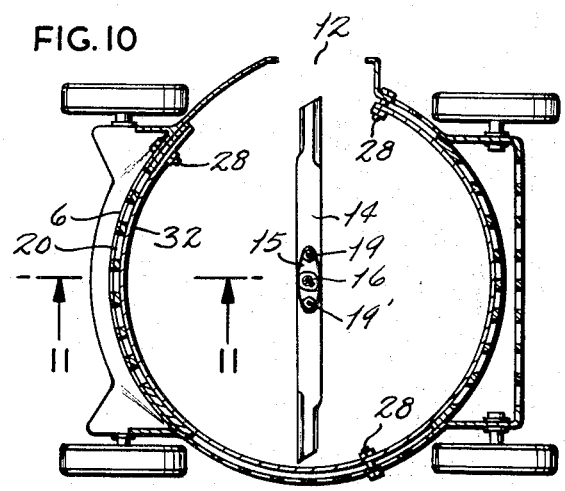
FIG. 10 is a bottom plan looking upward of the mower with components added to change it from a combination mower and mulcher to a mower.
Figure 12:
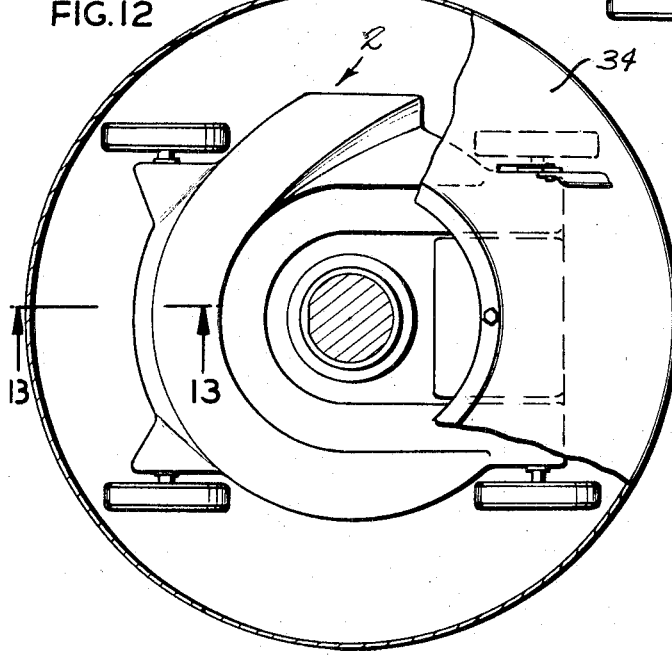
FIG. 12 is a bottom plan of the mower looking upward with a unit added to obviate danger from hard objects discharged by the unit.
Figure 13:
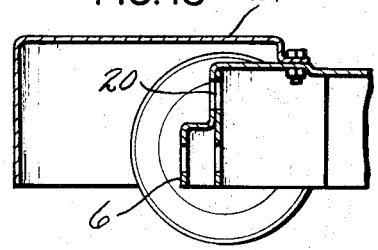
FIG. 13 is a sectional view taken along line 13—13 of FIG. 12.

If the unit is to be used to mulch leaves rather than vegetation which is cut at the same time, an additional cutting blade 24 is attached to shaft 16 along with cutting blade 14. Blade 24 has an extra pitch as shown at 25 in FIG. 8 so that when the unit is operated blade 24 acts as a fan as well as a cutting blade, lifting vegetation and leaves up to be cut. Plate 22 is removed and a band 26 is attached to skirt 6 by bolts 28. Openings 30 in band 26 are located substantially in alignment with the openings 20 in skirt 6 and with escape gate 12 but are smaller in size than openings 20. A diameter of approximately ¾ of an inch has been found satisfactory for openings 30.

With band 26 and blade 24 in place, the unit effectively mulches leaves. Blade 24 lifts the leaves into cutting position so that they are cut by both blades until the particles are small enough to pass through openings 30.

When the unit of the present invention is to be used as a standard rotary mower without mulching, plate 22 is removed and a band 32 is attached inside skirt 6 by bolts 28. This band covers openings 20 but is not a full circle and does not cover escape gate 12. This converts the unit into a rotary mowing machine of the standard type. Cut vegetation is expelled through escape gate 12 in the customary manner.

Thus, the unit of the present invention is adapted to operate in three modes. For standard mowing without mulching, the unit is provided with band 32. When the unit is used as a combination mower and mulcher, band 32 is removed and plate 22 is attached across escape gate 12. When the unit is used solely for mulching leaves plate 22 is removed, additional cutting blade 24 is added, and band 26 is attached within skirt 6.

For commercial or large units used in public areas for mowing or leaf mulching, an overskirt 34 is preferably attached over plate 4 and projects out over the entire unit. This skirt 34 obviates danger from flying glass or other hard objects encountered by the mower and mulcher in cutting vegetation in public areas.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall

What is claimed is:

1. A combination mower and mulcher comprising a rotating cutter; a plate over said cutter; a skirt attached to said plate and extending downwardly therefrom where it surrounds a portion of said cutter to shield said cutter and control the discharge of vegetation being cut by said cutter; means mounted on said plate for rotating said cutter; a plurality of large apertures in said skirt for discharging mulched vegetation; and a band detachably secured around the interior surface of said skirt; said band including small apertures therein which are aligned with and which are smaller than said large apertures in said skirt.

2. A combination mower and mulcher according to claim 1 wherein an overskirt is attached to said plate and extends over and around said skirt to interrupt and deflect objects propelled outwardly by said blade through said small and large apertures.

3. A combination mower and mulcher according to claim 2 wherein said mower and mulcher is supported by a plurality of wheels; said overskirt extending over and around said wheels.

4. A combination mower and mulcher according to claim 1 wherein said rotating cutter includes first and second rotatable cutting blades, one of said cutting blades having a pitch which creates an updraft when said cutter is rotated.

5. A combination mower and mulcher according to claim 1 wherein said skirt is provided with an escape gate for discharging cut vegetation; a plate being detachably secured over said escape gate; said plate having apertures therein which are approximately the same size as said large apertures of said skirt.

6. A combination mower according to claim 1 wherein said small apertures are approximately three-fourths of an inch in diameter and said large apertures are approximately one and one-fourth inches in diameter.

References Cited

UNITED STATES PATENTS

| | | | |
|---|---|---|---|
| 2,659,191 | 11/1953 | Miller et al. | 56—25.4 |
| 2,663,984 | 12/1953 | Clark | 56—25.4 |
| 2,706,372 | 4/1955 | Blydenburgh | 56—25.4 |
| 2,712,211 | 7/1955 | Smith et al. | 56—25.4 XR |
| 2,718,739 | 9/1955 | Long | 56—25.4 XR |
| 2,791,080 | 5/1957 | Shaw | 56—25.4 |
| 2,942,400 | 6/1960 | Sylvester | 56—25.4 XR |
| 2,957,295 | 10/1960 | Brown | 56—25.4 |
| 3,134,212 | 5/1964 | Gary | 56—25.4 |
| 3,382,653 | 5/1968 | De Buigne | 56—295 XR |

LOUIS G. MANCENE, Primary Examiner

J. A. OLIFF, Assistant Examiner

U.S. Cl. X.R.

56—255

UNITED STATES PATENT OFFICE
CERTIFICATE OF CORRECTION

Patent No. 3,531,923      Dated October 6, 1970

Inventor(s) Manford S. DeLay

It is certified that error appears in the above-identified patent and that said Letters Patent are hereby corrected as shown below:

Column 2, line 12, "10" should read --19--.

SIGNED AND SEALED
NOV 24 1970

(SEAL)
Attest:

Edward M. Fletcher, Jr.
Attesting Officer

WILLIAM E. SCHUYLER, JR.
Commissioner of Patents